(12) United States Patent
Ryan et al.

(10) Patent No.: US 8,442,423 B1
(45) Date of Patent: May 14, 2013

(54) TESTING WITHIN DIGITAL MEDIA ITEMS

(75) Inventors: Thomas A. Ryan, Los Altos, CA (US); Edward J. Gayles, Tracy, CA (US); Laurent An Minh Nguyen, Los Altos, CA (US); Steven K. Weiss, Foster City, CA (US); Martin Görner, Meudon (FR)

(73) Assignee: Amazon Technologies, Inc., Reno, NV (US)

( * ) Notice: Subject to any disclaimer, the term of this patent is extended or adjusted under 35 U.S.C. 154(b) by 517 days.

(21) Appl. No.: 12/360,044

(22) Filed: Jan. 26, 2009

(51) Int. Cl.
*G09B 7/00* (2006.01)
*H04M 1/00* (2006.01)
*G06F 15/173* (2006.01)

(52) U.S. Cl.
USPC ........... 434/362; 434/322; 434/323; 434/350; 455/556.2; 455/566; 704/258; 706/62; 709/225

(58) Field of Classification Search .................. 434/350, 434/30, 362, 322, 323; 709/225, 203, 218, 709/217, 204; 343/204, 350; 455/556.2, 455/414.2; 707/104.1, 3, 5; 704/258; 706/62
See application file for complete search history.

(56) References Cited

U.S. PATENT DOCUMENTS

| | | | |
|---|---|---|---|
| 6,988,138 B1 * | 1/2006 | Alcorn et al. ................. | 709/225 |
| 2002/0052860 A1 * | 5/2002 | Geshwind ...................... | 706/62 |
| 2002/0150875 A1 * | 10/2002 | Helmick et al. .............. | 434/362 |
| 2004/0029081 A1 * | 2/2004 | Jaros et al. ...................... | 434/30 |
| 2006/0024654 A1 * | 2/2006 | Goodkovsky .................. | 434/350 |
| 2007/0031804 A1 * | 2/2007 | Mandalia et al. ............. | 434/350 |
| 2007/0196808 A1 * | 8/2007 | Call ............................... | 434/350 |
| 2007/0269788 A1 * | 11/2007 | Flowers et al. ............... | 434/350 |
| 2008/0120342 A1 * | 5/2008 | Reed et al. .................. | 707/104.1 |
| 2008/0243788 A1 * | 10/2008 | Reztlaff et al. .................... | 707/3 |
| 2008/0243828 A1 * | 10/2008 | Reztlaff et al. .................... | 707/5 |
| 2008/0293450 A1 * | 11/2008 | Ryan et al. .................. | 455/556.2 |
| 2010/0062750 A1 * | 3/2010 | Nurminen et al. .......... | 455/414.2 |
| 2011/0066438 A1 * | 3/2011 | Lindahl et al. ................ | 704/258 |
| 2011/0130172 A1 * | 6/2011 | Rao ............................... | 455/566 |

OTHER PUBLICATIONS

"Franklin Pocket Prep," http://www.franklin.com/handhelds/test_preparation/, Jun. 18, 2009.*

* cited by examiner

*Primary Examiner* — Nikolai A Gishnock
*Assistant Examiner* — Randall N Crenwelge
(74) *Attorney, Agent, or Firm* — Lee & Hayes, PLLC

(57) ABSTRACT

A digital media item, such as an electronic book (eBook), may include testing content. The testing content may include questions about the content of the digital media item. When is user is viewing the digital media item on an electronic device, such as an eBook reader, the user may be allowed to select whether the testing content is displayed. The user may also be allowed to select a particular mode of testing, such as automatic testing, selective testing, etc. If the user chooses to display the testing content, the user may also be allowed to provide answers to the testing questions.

22 Claims, 13 Drawing Sheets

TESTING WITHIN DIGITAL MEDIA ITEMS

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. As such, benefits may be realized from improved systems and methods for interacting with an electronic device.

DETAILED DESCRIPTION

Figure 1:
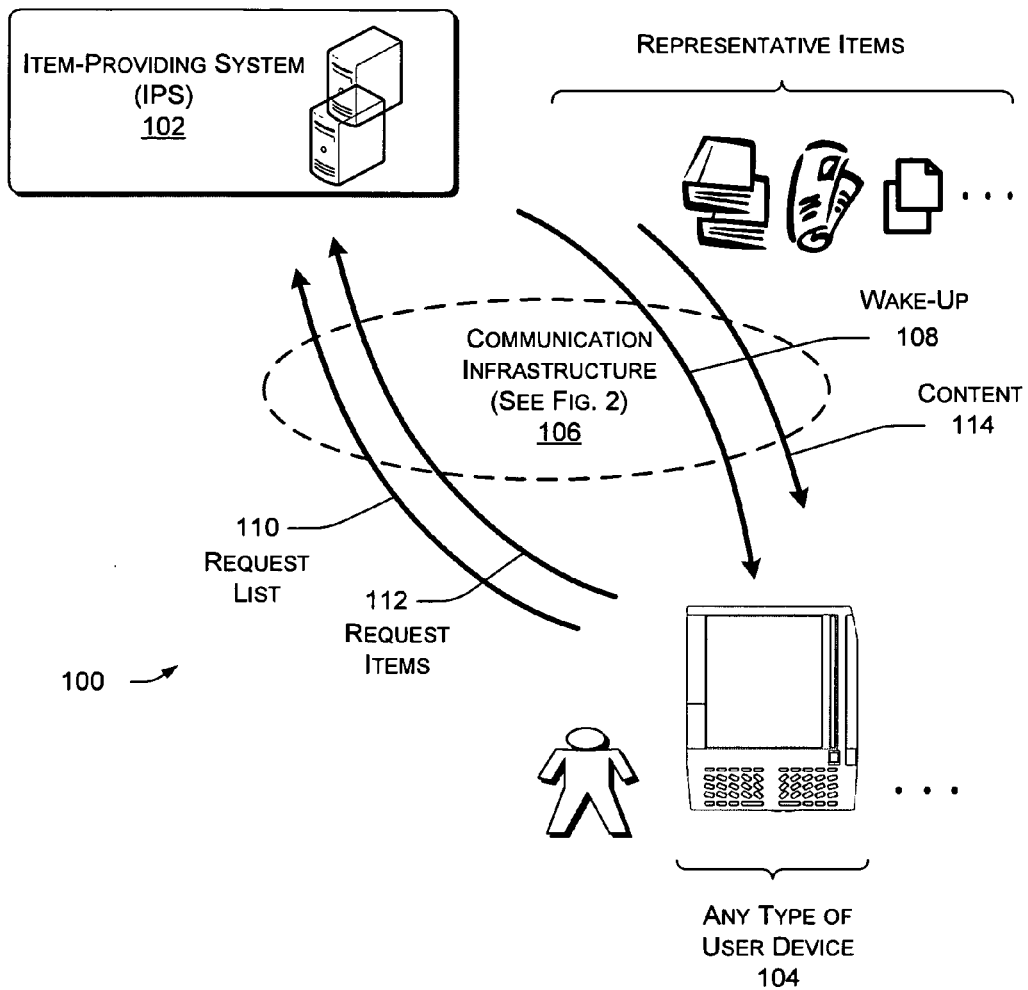
FIG. 1 is a block diagram illustrating a system for downloading items from an Item Providing System (IPS) to a user device.

According to one illustrative implementation, this disclosure sets forth functionality for downloading items to a user device. The functionality may be manifested in various systems, modules, computer readable media, data structures, methods, and other forms.

The "item" referenced above may correspond to any type of content. In one case, the item corresponds to a digital media item. The media item may include, without limitation, text content, image content, audio content, video content, hypertext protocol content, and so on, or any combination of these kinds of content. In addition, or alternatively, the item may include instruction-bearing content, such as machine readable program code, markup language content, script content, and so forth. For instance, an item may correspond to a software upgrade or the like.

More specifically, in one case, the term "item" may refer to a specific unit of merchandisable content, such as a book (e.g., an "eBook"), an issue of a magazine, and so on. Alternatively, an item may refer to smaller parts of a merchandisable unit, such as a chapter of a book or a song in an album. Alternatively, an item may refer to a larger compilation of component items which are related in any manner. For instance, an item may refer to multiple issues of a magazine in a particular year.

The term "entry" corresponds to information which refers to an item. For example, a list of entries may include reference information which identifies respective media items.

Certain drawings illustrate the features by showing various logic, modules, components, functionality, and so forth. The terms "logic," "module," "component," "functionality" and the like generally represent hardware, software, firmware, or any combination of these elements, or yet some other kind of implementation. For instance, in the case of a software implementation, the terms "logic," "module," "component," or "functionality" may represent instruction-bearing content to perform specified tasks when executed on a processing unit or units (e.g., a CPU or CPUs). The instruction-bearing content may be stored in one or more machine-readable media.

The term "machine-readable media" or the like refers to any kind of media for retaining information in any form, including various kinds of storage devices (magnetic, optical, static, etc.). The term "machine-readable media" also encompasses transitory forms of representing information, including various hardwired and/or wireless links for transmitting the information from one point to another.

Other figures illustrate features in signal diagram form and/or flowchart form. In this mode of explanation, certain operations are described as constituting distinct tasks performed in a certain order. Such implementations are illustrative and non-limiting. Separate operations described in these figures may be grouped together and performed in a single operation, while certain single operations may be performed in multiple parts. Certain operations may be performed in an order different from the order illustrated in the figures. Certain operations may be performed by different agents than is identified in the figures. The operations shown in the figures may be implemented by software, firmware, hardware, manual processing, or other form, or by any combination of these forms.

In general, the various features described in the implementations may be regarded as optional features, meaning that these features may be omitted or replaced with other features. Further, the various implementations described herein may be supplemented by adding additional features.

FIG. 1 is a block diagram illustrating a system 100 for downloading items from an Item Providing System (IPS) 102 to a user device 104. At the device 104, the user may consume the media items in electronic form, as opposed to traditional hard-copy form. Although not shown, the user device 104 represents one of a potentially great number of user devices.

As explained above, the term "item" has broad connotation. The following list, which is non-exhaustive, identifies representative types of items.

An item may correspond to an eBook item. An eBook item, in turn, may refer to a book in electronic form or to one or more portions of a book (such as a chapter of a book) or to a compilation of multiple books (such as a book series), and so on. An eBook is an example of a general class of items referred to herein as pre-generated items. The term pre-generated item refers to content typically (although not necessarily) provided to a user in response to the user's on-demand request for the content after it has been received and stored by the IPS 102.

An item may correspond to an eBook item with interactive testing capability. An eBook item with interactive testing capability is an eBook item that includes one or more interactive tests with the eBook that allows the user to be tested with respect to the eBook. More details regarding an eBook item with interactive testing capability are found below.

An item of content may also correspond to a subscription-related item. A subscription-related item refers to any item the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of the item by the IPS 102, rather than the user's on-demand request for a pre-generated item.

An item may also correspond to a personal document item, or simply "personal item." A personal item refers to a document the user forwards in advance to the IPS 102, whereupon the IPS 102 converts the item to a device-readable format.

An item may also correspond to audio content, such as a piece of music, a collection of music, an audio book, and so on. An item may also correspond to a bundle of information generated in response to a query made by the user. An item may also correspond to instruction-bearing content, such as a software update. An item may also correspond to advertising material downloaded to the user device by any entity or combination of entities. Various rules may be applied to govern the downloading of this type of item.

An item may also correspond to a sample of a more complete version of the item. In one case, a sample-type item may embed one or more links to allow the user to acquire its full-version counterpart, or another part (e.g., chapter) of the item. In another case, a publisher or author may release an eBook or other item in a series of installments. Each installment may be regarded as an item.

An item may correspond to a draft of an item, meaning an item in a state that its author does not regard as necessarily final. The term "item" may encompass yet other forms of content; the above types of items are representative.

The item-providing system (IPS) 102 corresponds to any functionality or combination of functionality for forwarding items to the user device 104. In one case, the IPS 102 may correspond to network-accessible server-based functionality, various data stores, and/or other data processing equipment. The IPS 102 may be implemented by a single collection of functionality provided at a single physical site. Alternatively, the IPS 102 may be implemented by multiple collections of functionality, optionally provided at plural physical sites. The IPS 102 may be administered by a single entity or plural entities.

In one case, the IPS 102 corresponds to an entity which provides items to users upon the users' purchase of the items. In this role, the IPS 102 may essentially act as a bookseller or the like. In one particular commercial environment, the IPS 102 may also offer services which allow users to purchase hard-copy books for physical delivery to the users; in this context, the IPS 102 may allow users to download electronic items to respective user devices as part of its entire suite of services. In other cases, the IPS 102 corresponds to an entity which provides items to users on a non-fee basis or on the basis of some other type of alternative compensation arrangement. Thus, the term "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning the user may freely carry the user device 104 from one location to another. In one particular case, the user device is designed as a book reader device, also known as an eBook reader device. In this case, the user device 104 functions as the electronic counterpart of a paper-based book. The user may hold the user device 104 in a manner similar to a physical book; the user may electronically turn the pages of the book, and so on.

Without limitation, FIG. 1 illustrates a particular type of eBook reader device. Additional details regarding this particular type of reader device are provided below. Alternatively, the user device 104 may correspond to any other type of portable device, such as a portable music player, a personal digital assistant (PDA), a mobile telephone, a game module, a laptop computer, and so on, and/or any combination of these types of devices. Alternatively, or in addition, the user device 104 may correspond to a device which is not readily portable, such as a personal computer, a set-top box associated with a television, a gaming console, and so on.

A communication infrastructure 106 bi-directionally couples the IPS 102 to the user device 104. Namely, the IPS 102 downloads items, upgrades, testing content, and/or other information to the user device 104 via the communication infrastructure 106. The IPS 102 receives various instructions and other data from the user device 104 via the communication infrastructure 106.

The communication infrastructure 106 may include any combination of communication functionality, including any combination of hardwired links and/or wireless links, etc. For instance, FIG. 2 (to be discussed below in turn) shows one implementation of the communication infrastructure 106 which includes a combination of a wide area network (WAN) and wireless infrastructure. By virtue of the wireless component of the communication infrastructure 106, the user may use the user device 104 to purchase items and consume items without being tethered to the IPS 102 via hardwired links. Thus, for instance, a user may purchase and consume an eBook using the device while riding in a car as a passenger, while hiking in a park, while boating on a lake, and so forth.

FIG. 1 shows four exchanges which describe, in very high-level form, part of a procedure for downloading items to the user. In a first message 108, the IPS 102 may send a notification message to the user device 104. The notification message 108 instructs the user device 104 to download one or more items from the IPS 102 and/or perform other actions. In a second message 110, the user device 104 requests the IPS 102 to supply a list which identifies one or more items to be downloaded (and/or other actions to be performed, such as, in one case, sending information back to the IPS 102).

The user device 104 receives the list from the IPS 102 in response to the second message 110 (note FIG. 1 does not specifically identify the transmission of the list from the IPS 102 to the user device 104). If the instructions identify items to be downloaded, in a third message 112, the user device 104 sends a request to the IPS 102, asking the IPS 102 to download the items identified in the list. In a fourth message 114, the IPS 102 downloads the requested items to the user device 104. In effect, the user device 104 retrieves the items using a pull approach, but the pull approach is initiated by a push operation (by virtue of the IPS 102 "pushing" a notification message 108 to the user device 104).

In one case, the notification message 108 may correspond to a certain type of notification message used to commence voice mode interaction, such as a telephone ring. In this case, the notification message 108 is also referred to as a Terrestrial Phone Home or a TelePhone Home (TPH) signal. (It will be appreciated that the identifiers Terrestrial Phone Home, TelePhone Home, TPH, etc. are arbitrary labels of convenience to facilitate explanation herein.) The other messages may take the form of data mode messages.

In one case, the user device 104 may be configured to receive and act on the TPH signal without actually formally answering the TPH signal. In other words, the user device 104 receives the TPH signal and does not make a voice connection, but rather initiates steps to download items from the IPS 102. In some environments, a wireless provider system may charge a fee when a call is answered, but not if a user device is called and does not answer. Thus, the strategy of ringing the user device 104 without an answer may allow the IPS 102 to communicate instructions to the user device 104 without incurring a fee for the user device 104 or the IPS 102.

Figure 2:
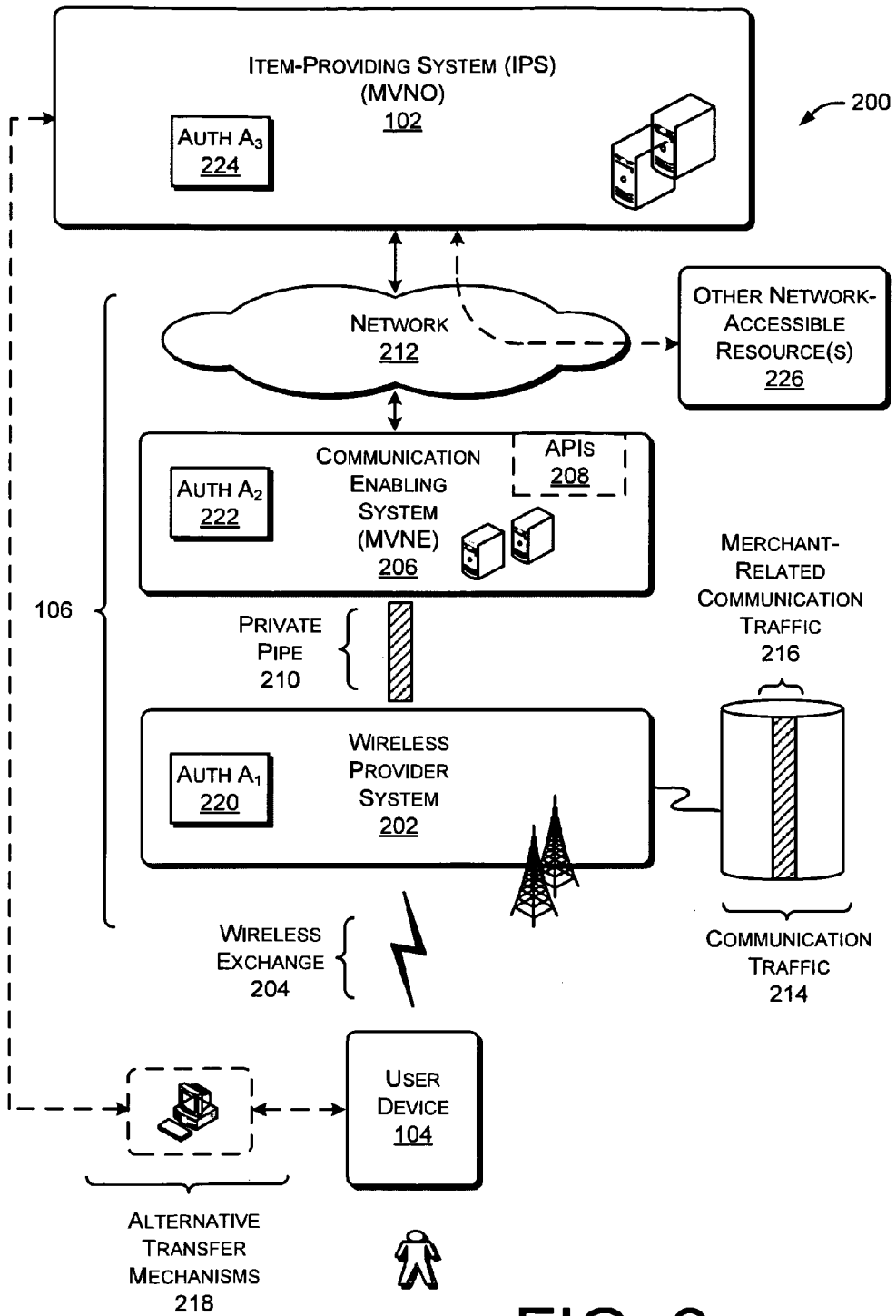
FIG. 2 shows a system which represents one illustrative implementation of the general system of FIG. 1.

FIG. 2 shows a system 200 which represents one illustrative implementation of the general system 100 of FIG. 1. By way of overview, the system 200 includes the components identified above, namely IPS 102 coupled to a user device 104 via communication infrastructure 106.

The communication infrastructure 106 includes multiple components. A first component is a wireless provider system 202. The wireless provider system 202 corresponds to any infrastructure for providing a wireless exchange 204 with the user device 104. In one case, the wireless provider system 202 is implemented using various data processing equipment, communication towers, and so forth (not shown).

Alternatively, or in addition, the wireless provider system 202 may rely on satellite technology to exchange information with the user device 104. The wireless provider system 202 may use any form of electromagnetic energy to transfer signals, such as, without limitation, radio-wave signals. The wireless provider system 202 may use any communication technology to transfer signals, such as, without limitation, spread spectrum technology, implemented, for instance, using the Code Division Multiple Access (CDMA) protocol. The wireless provider system 202 may be administered by a single entity or by a cooperative combination of multiple entities.

The communication infrastructure 106 also includes a communication-enabling system 206. One purpose of the communication-enabling system 206 is to serve as an intermediary in passing information between the IPS 102 and the wireless provider system 202. The communication-enabling system 210 may be implemented in any manner, such as, without limitation, by one or more server-type computers, data stores, and/or other data processing equipment. The communication enabling system may expose one or more Application Programming Interfaces (APIs) 208. The IPS 102 may call on the APIs 208 to perform various respective functions.

The communication-enabling system 206 communicates with the wireless provider system 202 via a dedicated channel 210, also referred to as a dedicated communication pipe or private pipe. The channel 210 is dedicated in the sense it is exclusively used to transfer information between the communication-enabling system 206 and the wireless provider system 202. In contrast, the communication enabling system 206 communicates with the IPS 102 via a non-dedicated communication mechanism, such as a public Wide Area Network (WAN) 212. For example, the WAN 212 may represent the Internet.

The communication enabling system 206 may serve as an adaptor. For instance, assume that, in one particular implementation, the IPS 102 acts as a data center which is set up to receive information via a wide area public network. Assume further the wireless provider system 202 is set up to interact with clients via a private pipe. The communication-enabling system 206 interacts with the IPS 102 via the wide area network 212 and the wireless provider system 202 via the private pipe 210, thus accommodating the processing preferences of the IPS 102 and the wireless provider system 202. By virtue of this intermediary role, the communication-enabling system 206 may be referred to as a Mobile Virtual Network Enabler (MVNE), while the IPS 102 may be referred to as a Mobile Virtual Network Operator (MVNO).

In terms of a business paradigm, the IPS 102 may interact with the wireless provider system 202 using a wholesale account. On this basis, the IPS 102 may pay the wireless provider system 202 a fee based on the aggregate use of the wireless provider system 202 by all of the user devices. The IPS 102 may recoup these costs through fees charged to the end-users. In this illustrative business scenario, the wireless provider system 202 does not send bills directly to the users who operate the user devices.

More specifically, the wireless provider system 102 handles an entire amount of communication traffic 214 associated with all uses of its services. A subset of the entire amount of communication traffic 214 represents IPS-related communication traffic 216, also referred to as merchant-related communication traffic. The IPS-related traffic 216 represents the exchange of information occurring between the IPS 102 and all of the user devices which interact with the IPS 102. The wireless provider system 202 discriminates the IPS-related traffic 216 from other traffic based on unique key information associated with the IPS-related traffic 216.

The wireless provider system 202 may prepare a bill based on the total amount of IPS related traffic 216. As noted above, the wireless provider system 202 may seek payment for its services from the IPS 102, not the individual users of the devices.

The examples set forth above are representative; other strategies may be used to exchange information between the IPS 102 and the user device 104. In alternative cases, for instance, the system 200 may be configured such that the wireless provider system 202 does indeed recoup costs directly from individual users. Or the system 200 may be configured such that the wireless provider system 202 submits bills to either the IPS 102 (in aggregate) or to the individual users, at the option of the individual respective users.

The users may access the IPS 102 through alternative communication routes which bypass the wireless provider system 202. For instance, as indicated by alternative access path 218, a user may use a personal computer or the like to access the IPS 102 via the wide area network 212, circumventing the wireless provider system 202 and the communication-enabling system 206. The user may download items through this route in conventional fashion. The user may then transfer the items from the personal computer to the user device 104, e.g., via a Universal Serial Bus (USB) transfer mechanism, through the manual transfer of a portable memory device, and so on. This mode of transfer may be particularly appropriate for large files, such as audio books and the like. Transferring such a large amount of data in wireless fashion may have a relatively high cost. However, the system 200 may also be configured to transfer large files (such as audio files) via the wireless exchange 204.

The system 200 of FIG. 2 also provides various security-related features. According to one feature, the system 200 applies multiple layers of authentication. Namely, the wireless provider system 202 includes authentication functionality A1 220 to perform a first level of authentication. The communication-enabling system 206 provides authentication functionality A2 222 to perform a second level of authentication. The IPS 102 provides authentication functionality A3 224 to perform a third layer of authentication. Each layer of authentication performs checking to ensure the user device currently attempting to interact with the IPS 102 is duly authorized to access the IPS 102. The distributed nature of the authentication helps ensure someone who has obtained a user device through improper means cannot gain access to the services provided by the IPS 102.

According to another security-related feature, the system 200 may provide various constraints which restrict the manner in which a user may use the device 104. For example, the communication-enabling system 206 may be configured such that it will allow user devices to access only one or more predetermined addresses associated with the IPS 102. This means that, in one case, a user cannot use the user device 104 to directly access a network-accessible site without being first routed through the IPS 102. This prevents the user from using the user device 104 as an unrestricted broadband interface to network-accessible resources.

More specifically, the IPS 102 may include a web browsing proxy (to be discussed below in greater detail). When the user attempts to access a network accessible resource 226, the communication enabling system 206 first directs the user to the browsing proxy module. The browsing proxy module may then either deny the request or accept the request by allowing the user to access the network-accessible resource 226. The browsing proxy module may apply various rules (to be discussed) in determining whether to deny or accept the request to access the network-accessible resource 226. In this manner, the communication-enabling system 206 and the IPS 102 do not permit the user to directly access the network accessible resources.

In another case, the system 200 may allow the user to directly interact with network-accessible resources, that is, without being routed through the IPS 102.

Figure 3:
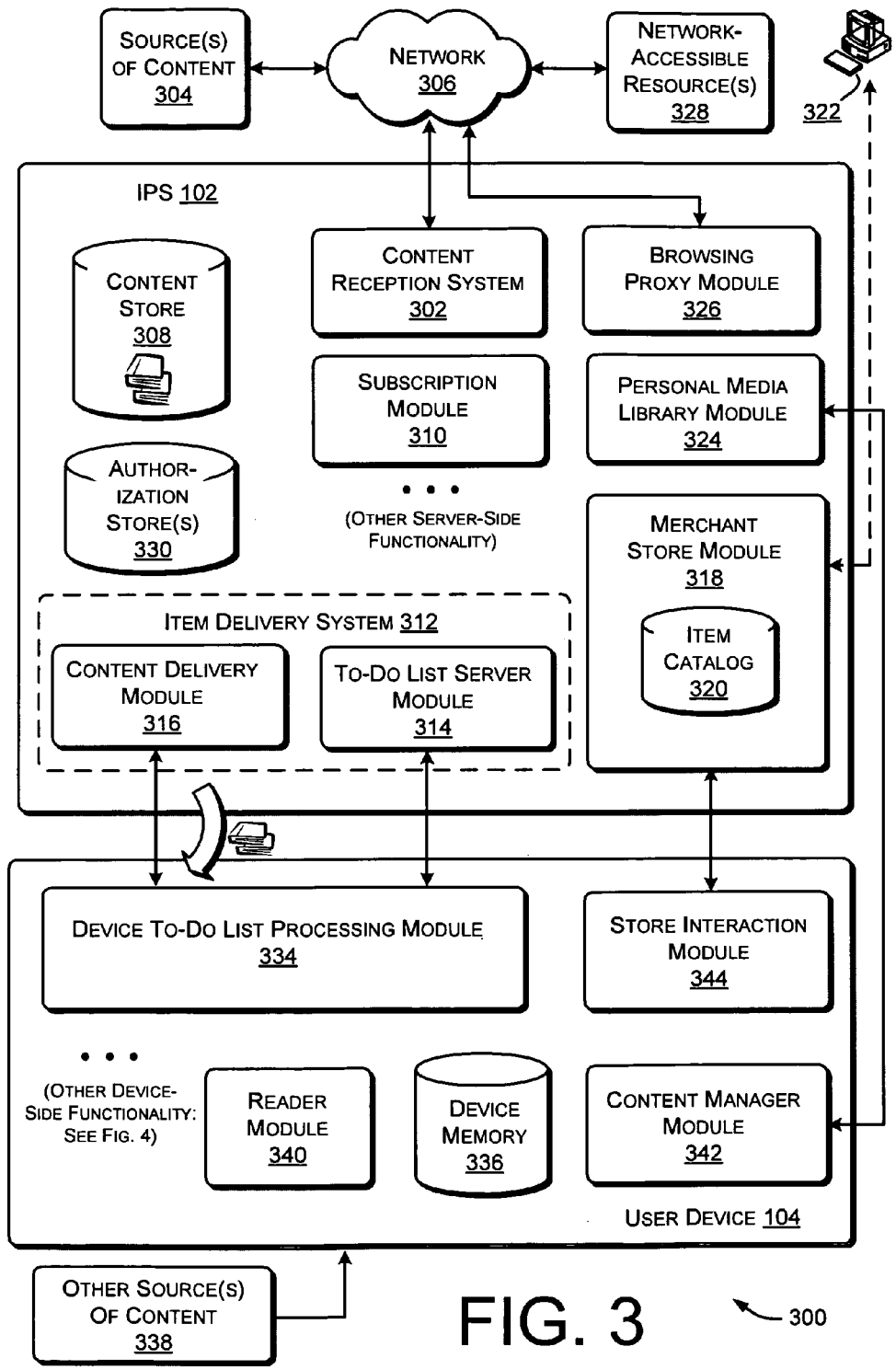
FIG. 3 shows a system including a more detailed depiction of the IPS and the user device.

FIG. 3 shows a system 300 including a more detailed depiction of the IPS 102 and the user device 104 (which were introduced in FIGS. 1 and 2). Although not shown, the system 300 shown in FIG. 3 may use the wireless features shown in FIG. 2.

In another implementation, the system 300 may use some other communication infrastructure than is shown in FIG. 2, which may optionally omit the use of wireless communication.

Addressing the details of the IPS 102 first, this system 102 performs various functions. Different modules are associated with these different functions. One module is a content reception system 302. The content reception system 302 receives content from one or more sources of content 304. The sources 304 may represent any type of provider of content, such as eBook publishers, newspaper publishers, other publishers of periodicals, various feed sources, music sources, and so on.

The sources 304 may be administered by a single entity or may be administered by separate respective entities. Further, the entity administering the IPS 102 may correspond to a same entity which administers one or more of the sources 304. Alternatively, or in addition, the entity administering the IPS 102 may interact with one or more different entities administering one or more respective sources 304. In the latter case, the entity administering the IPS 102 may enter into an agreement with the source entities to receive content from these source entities.

In the above example, the entities associated with the sources 304 may correspond to commercial organizations or other types of organizations. In another case, one or more of the sources may correspond to individual users, such as the creators of the items. For example, a user may directly provide items to the IPS 102. Alternatively, or in addition, a user may supply content to a community repository of items, and the IPS 102 may receive content from this repository, and so on.

The content creation system 302 may obtain the content through various mechanisms. In one case, the content reception system 302 obtains the content via one or more networks 306. The networks 306 may represent a WAN, such as the Internet, a Local Area Network (LAN), or some combination thereof. The content reception system 302 may receive the information in various forms using any protocol or combination of protocols. For instance, the content reception system 302 may receive the information by making a Hypertext Transfer Protocol (HTTP) request, by making a File Transfer Protocol (FTP) request, by receiving a feed (e.g., an RSS feed), and so forth.

In another case, the IPS 102 may obtain content via a peer-to-peer (P2P) network of sources 304. More generally, the content reception system 302 may proactively request the content in an on-demand manner (based on a pull method of information transfer). Or the content reception system 302 may receive the content in response to independent transfer operations initiated and performed by the sources 304 (based on a push method of information transfer). Alternatively, the content reception system 302 may use a combination of pull and push transfer mechanisms to receive the content.

The content reception system 302 may receive content in the form of items. Without limitation, the items may include eBooks, audio books, music, magazine issues, journal issues, newspaper editions, various feeds, and so forth. In one case, the content reception system 302 may receive some items expressed in a format not readable by the user device 104 (where the user device may optionally be configured to receive, process, and present content expressed in one or more predefined formats). To address this situation, the content reception system 302 may convert the items from their original format into a device-readable format (such as, without limitation, the .mobi format).

The content reception system 302 stores the items received (and optionally converts them to another format) in a content store 308. The content store 308 includes one or more storage systems for retaining items in electronic form, located at a single site or distributed over plural sites, administered by one or more entities.

The IPS 102 also includes a subscription module 310. The subscription module 310 manages users' subscriptions to subscription-related items. Generally, a subscription entitles a user to receive one or more subscription-related items (which are yet to be received and stored by the content reception system 302) based on any type of consideration or combination of considerations. Without limitation, subscription-related item types include magazines, journals, newsletters, newspapers, various feeds, and so forth. Users may arrange to receive subscription-related items by purchasing such subscriptions, or, more generally, by registering to receive such subscriptions (which, in some cases, may not involve the payment of a fee).

Alternatively, or in addition, the IPS 102 may automatically register users to receive subscription-related items without the involvement of the users (and possibly without the approval of the users). The latter scenario may be appropriate in the case in which the IPS 102 (or some other entity) registers a user to receive unsolicited advertisements, newsletters, and so on. The system 300 may allow the user to opt out of receiving such unsolicited information.

The IPS 102 may consult the subscription module 310 to determine which user devices should receive a newly-received subscription-related item. For instance, upon receiving an electronic issue of the magazine Forbes, the IPS 102 consults the subscription module 310 to determine the users who have paid to receive this magazine. The IPS 102 then sends the issue to the appropriate user devices.

An item delivery system 312 represents the functionality which actually performs the transfer of content to the user device 104. In one illustrative representation, the item-delivery system 312 includes two components: a to-do list server module 314 and a content delivery module 316. The to-do list server module 314 generally provides instructions for the user device 104. The instructions direct the user device 104 to retrieve items and perform other operations. The content delivery module 316 allows the user device 104 to obtain the items identified in the instructions received from the to-do list server module 314.

More specifically, in a first phase of information retrieval, the to-do list server module 314 sends a notification message to the user device 104. As described above, in one illustrative implementation, the to-do list server module 314 may send the notification message as a telephone ring. The user device 104 responds to the notification message by waking up (if "asleep"), which may involve switching from a first power state to a second power state (where the second power state consumes more power than the first power state). The user device 104 may optionally respond to the notification message without formally answering the signal, which avoids or reduces a fee associated with the wireless message.

The user device 104 may then contact the to-do list server module 314 to request instructions from the to-do list server module 314. More specifically, for each user device, the to-do list server module 314 maintains a list of entries, also referred to herein as a "to-do queue." An entry provides an instruction for a user device to perform an action. As will be described in greater detail below, there are different instructions that a device may be directed to perform, wherein a collection of instructions defines an IPS-device interaction protocol. One such action (e.g., associated with a GET instruction of the protocol) directs the user device 104 to retrieve an item from a specified location by specifying an appropriate network address (e.g., a URL) and appropriate arguments.

In a first phase of the downloading procedure, the user device 104 may retrieve n such entries, wherein n is an integer. In one scenario, the number n may be a subset of a total number of items in the to-do queue associated with the user device 104. In a second phase of the downloading procedure, the user device 104 may contact the content delivery module 316 to retrieve one or more items identified in the GET-related entries.

In general, after receiving the notification message (which may be implemented as a telephone ring), the item delivery system 312 may interact with the user device 104 in a data mode, e.g., using the Hypertext Transfer Protocol (HTTP), or some other protocol or combination of protocols.

The IPS 102 may also include a merchant store module 318. The merchant store module 318 may provide access to an item catalog 320, which, in turn, may provide information regarding a plurality of items (such as eBooks, audio books, subscription related items, testing content, and so on). As will be described in greater detail below, the merchant store module 318 may include functionality allowing a user to search and browse though the item catalog 320. The merchant store module 318 may also include functionality allowing a user to purchase items (or, more generally, acquire items based on any terms).

In one case, a user may interact with the merchant store module 318 via the user device 104 using wireless communication. Alternatively, or in addition, the user may interact with the merchant store module 318 via another type of device 322, such as a personal computer, optionally via wired links. In either case, when the user purchases or otherwise acquires an item via the merchant store module 318, the IPS 102 may invoke the item delivery system 312 to deliver the item to the user.

The IPS 102 may also include a personal media library module 324. The personal media library module 324 may store, for each user, a list of the user's prior purchases. More specifically, in one case, the personal media library module 324 may provide metadata information regarding eBook items and other on-demand selections (e.g., "a la carte" selections, such as subscription issues, testing content, etc.) which a user already owns. The personal media library module 324 may also provide links to the items in the content store 308. As will be described in greater detail below, to download an eBook item (or the like) which the user has already purchased, the user device 104 contacts the content delivery module 316.

The content delivery module 316 may interact with permission information and linking information in the personal media library module 324 in order to download the item to the user. In one use scenario, the user device 104 may access the content delivery module 316 in this manner to initiate downloading of an item which has been previously purchased by the user but has been deleted by the user device 104 for any reason.

The IPS 102 may also include a browsing proxy module 326. The browsing proxy module 326 may allow the user to access one or more network-accessible resources 328 via a browser module (to be discussed below) resident on the user device 104. As explained in the context of FIG. 2, when the user requests access to a particular network-accessible resource, the system 300 may first direct the user to the browsing proxy module 326. The browsing proxy module 326 may then apply various environment-specific business rules to determine whether or not to grant such access, and if granted, under what terms to grant such access. Through this mechanism, in one implementation, the user may be precluded from directly accessing the network accessible resources 328 using the user device 104.

The IPS 102 may also include various security-related features, such as one or more authorization stores 330. The authorization stores 330 may provide information which enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality," the IPS 102 may include additional functions, many of which are described below.

Now turning to the device-side features of the system 300, the user device 104 may include a device to-do list processing module 334. The purpose of the device to do list processing module 334 may be to interact with the item delivery system 312 to download items from the item delivery system 312. Namely, in a first phase of the downloading procedure, the device to-do list processing module 334 may first receive a notification message from the to-do list server module 314, which prompts it to wake up (if "asleep") and contact the to-do list server module 314 to retrieve a set of n entries.

Each entry may include an instruction which directs the device to-do list processing module 334 to perform an action. In a second phase, for a GET-type entry, the device to-do list processing module 334 may contact the content delivery module 316 to request and retrieve an item identified by the GET-type entry. As will be described in greater detail below, the user device 104 may signal a successful completion of the download process or a failure in the download process.

Upon downloading an item, the user device 104 may store the item in a device side memory 336, which in one example is a flash-type memory and may be any other type of memory in other examples. Although not shown, the user device 104 may also exchange information with any other source of content 338. In one illustrative case, the other source of content 338 may represent a personal computer or other data processing device. Such other source of content 338 may transfer an item to the user device 104 via a Universal Serial Bus (USB) connection and/or any other type(s) of connection(s). In this scenario, the other source of content 338, in turn, may receive the item from the IPS 102 (or other source) via hardwired connection (e.g., non-wireless connection). For example, to receive an audio book, the user may use a personal computer to non-wirelessly download the audio book from a network-accessible source of such content. The user may then transfer the audio book to the user device 104 via USB connection. In another illustrative case, the other source of content 338 may represent a portable memory module of any type, such as a flash type memory module, a magnetic memory module, an optical memory module, and so on.

The user device 104 may also include a reader module 340. The illustrative purpose of the reader module 340 is to present media items for consumption by the user using the user device 104. For example, the reader module 340 may be used to display an eBook to the user to provide a user experience which simulates the reading of a paper-based physical book.

The user device 104 may also include a content manager module 342. The purpose of the content manager module 342 is to allow the user to manage items available for consumption using the user device 104. For example, the content manager module 342 may allow the user to view a list of items available for consumption.

The content manager module 342 may also identify the sources of respective items: one such source corresponds to the device memory 336; another source corresponds to an attached portable memory (e.g., represented by the other source 338); another source corresponds to items identified in the personal media library module 324 (as may be revealed, in turn, by device-side metadata provided by the IPS 102); another source corresponds to subscription-related items identified by the subscription module 310, and so on. The content manager module 342 may allow the user to filter and sort the items in various ways. For example, the user may selectively view items which originate from the device store 336.

The user device 104 may also include a store interaction module 344. The store interaction module 344 may allow the user device 104 to interact with the merchant store module 318. The user may engage the store interaction module 344 to search and browse through items, to purchase items, to read and author customer reviews, and so on. As described above, the user may also use a personal computer or the like to interact with the merchant store module 318 via hardwired links.

Figure 4:
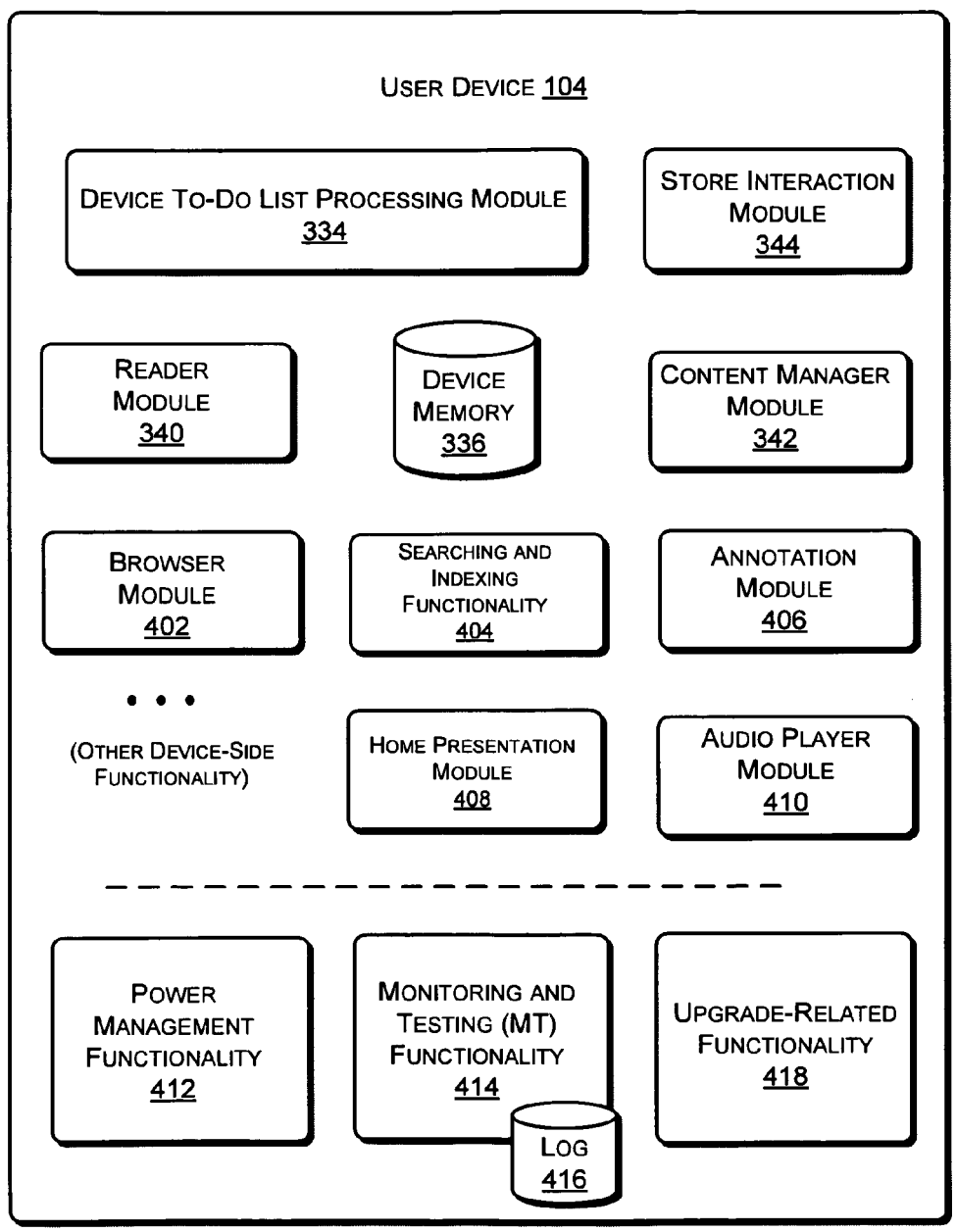
FIG. 4 shows the user device may also include a browser module.

The above-enumerated list of modules is representative and is not exhaustive of the types of functions performed by the user device 104. As indicated by the label "Other Device-Side Functionality," the user device 104 may include additional functions, many of which are described below. In fact, FIG. 4 shows additional device-side functionality. For completeness, FIG. 4 also identifies the various modules described above, including the device to-do list processing module 334, the device memory 336, the reader module 340, the content manager module 342, and the store interaction module 344. These features perform the functions described above.

FIG. 4 shows the user device 104 may also include a browser module 402. The browsing module 402 may allow the user device 104 to access one or more network accessible resources 328 via the browsing proxy module 326 provided by the IPS 102.

As explained above, the browsing proxy module 326 may permit or deny access to the network-accessible resources 328 based on a set of environment-specific rules. If permitted access, the device-side browser module 402 includes functionality for interpreting the content received from a network-accessible source and presenting such content to the user.

The user device 104 may also include searching and indexing functionality 404. The indexing aspect of this functionality 404 provides a mechanism for indexing an item received from the IPS 102 and/or for interacting with an index generated and supplied by the IPS 102 or by some other source. An index for a particular item (such as an eBook or newspaper edition) identifies the component parts (e.g., words) in the item, linking the component parts to their respective locations in the item. The searching aspect of the functionality 404 provides a mechanism for searching for identified components (e.g., words, phrases, etc.) in an item, and for performing other search-related functions. The searching aspect relies on the indexing aspect.

The user device 104 also may include an annotation module 406. The annotation module 406 allows a user to create annotations to supplement a particular item. For instance, the user may create one type of annotation to mark a page, thus acting in the manner of a bookmark. The user may create another type of annotation highlighting a portion of the item, such as a word, phrase, sentence, etc. in an eBook.

The user may create another type of annotation by adding one or more notes to an item. Generally, the annotation module 406 may store annotation information which identifies the types of annotations created, the locations within the item associated with the annotations, the content of the annotations (e.g., in the case of note-type annotations), and so on.

More specifically, the user device 104 may locally store the annotations. Further, the IPS 102 may optionally store the annotations in a backup store; this allows the user to download the annotations in the event they are deleted from a device-side store. Wherever stored, the user device 104 may restore the annotations upon presentation of the corresponding item which is the "target" or subject of the annotations. For example, when a user accesses an eBook which has been annotated on one or more prior occasions, the annotation module 406 may access the annotation information and display the user's annotations within the text. The annotation module 406 may also perform a related function allowing a user to identify and extract (e.g., "clip") one or more portions of an item and store such portions in a clipping file. In one illustrative case, clippings are stored as unencrypted text files. In one case, the annotations can be associated with a particular entity, such as a user. Alternatively, or in addition, the annotations can be associated with a copy of the annotated item, such as an eBook.

The user device 104 may also include a home presentation module 408. The home presentation module 408 may provide a home page when the user first turns on the user device and/or at other junctures. The home page may act as a general portal allowing a user to access media items and various features provided by the user device 104. In one illustrative case, the home page may present a summary of some (or all) of the items available for consumption using the user device 104.

The user device 104 may also include an audio play module 410. The audio player module 410 may provide an interface which allows the user to play back and interact with audio items, such as music, audio books and the like.

The above-described features of the user device 104 may pertain to applications with which the user may interact or which otherwise play a high-level role in the user's interaction with the user device 104. The user device 104 may include a number of other features to perform various lower-level tasks, possibly as background-type operations.

Power management functionality 412 performs one such background-type operation. More specifically, the power management functionality 412 corresponds to a collection of hardware and/or software features operating to manage the power consumed by the user device 104. The power management functionality 412 generally operates to reduce the power consumed by the device 104. The power management functionality 412 achieves this goal by selectively powering down features not actively being used (or for which there is an assumption these features are not actively being used). The power management functionality 412 achieves particularly noteworthy power savings by powering down features which make large power demands, such as one or more features associated with wireless communication.

The user device 104 may also include performance Monitoring and Testing (MT) functionality 414. The MT functionality 414 maintains a performance log 416 identifying the behavior of the device 104. The IPS 102 and/or other entities may access the performance log 416, along with other information gleaned from the communication infrastructure 106, to help diagnose anomalies in the operation of the user device 104 and the system 300 as a whole. The MT functionality 414 may also interact with testing functionality provided by the IPS 102 and/or other entities. For example, the MT functionality 414 may respond to test probes generated by the IPS 102.

The user device 104 may also include an upgrade-related functionality 418. The upgrade-related functionality 418 allows the user device 104 to receive and integrate instruction-bearing update items (such as software updates). In one case, the upgrade-related functionality 418 may automatically receive instruction-bearing items provided by the IPS 102 (and/or by other entities). An administrator at the IPS 102 may manually initiate the upgrade procedure by which an instruction-bearing update item is forwarded to the user device 104. Or an automated IPS-side routine may initiate the upgrade procedure. In any event, the user device may receive the instruction-bearing update item without the involvement of the user or with minimal involvement from the user. In this sense, the upgrade procedure may be viewed as "transparent." In another case, the upgrade-related functionality 418 may be operated by the user to manually access a source of instruction-bearing items (such as a prescribed website or the like) and download an item from this source.

In one implementation, the upgrade-related functionality 418 may forward version information to the IPS 102. The version information identifies the version of the instruction-bearing content being used by the user device 104. The IPS 102 may determine whether this version information is out-of-date (by reference to current version information). If out-of-date, the IPS 102 may react appropriately, e.g., by downloading an instruction-bearing item to the user device 104.

To repeat, the above-enumerated list of modules is representative and is not exhaustive of the types of functions performed by the user device 104. As indicated by the label "Other Device-Side Functionality," the user device 104 may include additional functions.

The IPS 102 described above may interact with any type of user device 104. In one case, the user device 104 is a portable-type device, meaning a device designed to be readily carried from location to location. In one specific case, the user device 104 allows the user to consume the media items while holding the user device 104, e.g., in a manner which simulates the way a user might hold a physical book. A portable user device may take the form of an eBook reader device, a portable music player, a personal digital assistant, a mobile telephone, a game module, a laptop computer, and so forth, and/or any combination of these types of devices. Alternatively, or in addition, the user device 104 may correspond to a device not readily portable, such as a personal computer, set-top box associated with a television, gaming console, and so on.

Figure 5:
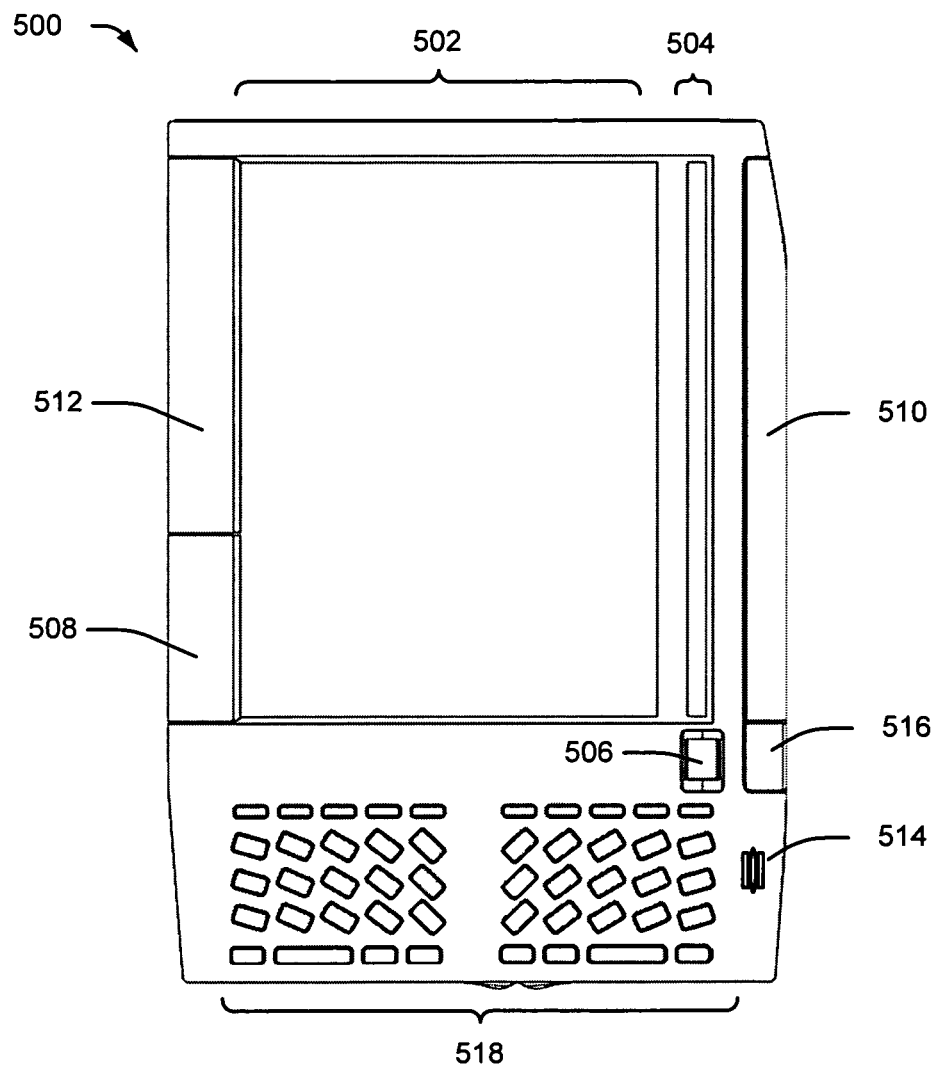
FIG. 5 shows one type of user device which may be used to interact with the IPS.

Without limitation, FIG. 5 shows one type of user device 500 which may be used to interact with the IPS 102. The user device 500 may include a wedge-shaped body designed to fit easily in the hands of a user, generally having the size of a paperback book. Other user devices may adopt different shapes and sizes.

In one representative design, the user device 500 includes two display parts: a main display part 502 and a supplemental display part 504. The main display part 502 presents various pages provided by the store interaction module 344, the reader module 340, the browser module 402, and so on. In one case, the supplemental display part 504 is used to present a cursor. The user may position the cursor to identify laterally adjacent portions in the main display part 502. Without limitation, in one illustrative case, the main display part 502 and/or the supplemental display part 504 may be implemented using electronic paper technology, such as provided by E Ink Corporation of Cambridge, Mass. This technology presents information using a non-volatile mechanism; using this technology, the user device 500 may retain information on its display even when the device is powered off.

The user device 500 includes various input keys and mechanisms. A cursor-movement mechanism 506 allows a user to move a cursor within the supplemental display part 504. In one representative case, the cursor-movement mechanism 506 may include a cursor wheel that may be rotated to move a cursor up and down within the supplemental display part 504. The cursor-movement mechanism 506 may be configured to allow the user to make a selection by pressing down the wheel. Other types of selection mechanisms may be used, such as a touch-sensitive display, a series of vertically and/or horizontally arrayed keys along the edge(s) of the main display part 502, one or more graphical scroll bar(s) in the main display part 502, a five-way controller or joystick, and so on.

The user device 500 also includes various page-turning buttons, such as next page buttons (508, 510) and a previous page button 512. The next page buttons (508, 510) advance the user to a next page in an item (relative to a page that is currently being displayed). The previous page 512 button advances the user to a previous page in an item (relative to a page that is currently being displayed). The user device 500 may also include a page-turning input mechanism 514 actuated by the user's thumb as it passes over the mechanism 514. This user experience simulates the manner in which a user turns a page in a physical book (e.g., by "thumbing through" a book). The user device 500 may also include a back button 516 allowing the user to advance to a previous page when using the browsing module 402. Although not shown, the user device 500 may include a switch for turning power on and off, a switch for enabling and disabling a wireless interface, and so on. The user device 500 may also include a keyboard 518. The keyboard 518 may include alphanumeric keys. The keys may be shaped and oriented in a manner which facilitates the user's interaction with the keys while the user holds the device 104 in the manner of a physical book. The user may use the keyboard 518 to enter search terms, annotations, URLs, and so forth. The user may also use the keyboard 518 to respond to testing content. The keyboard 518 may also include various special-function keys.

Figure 6:
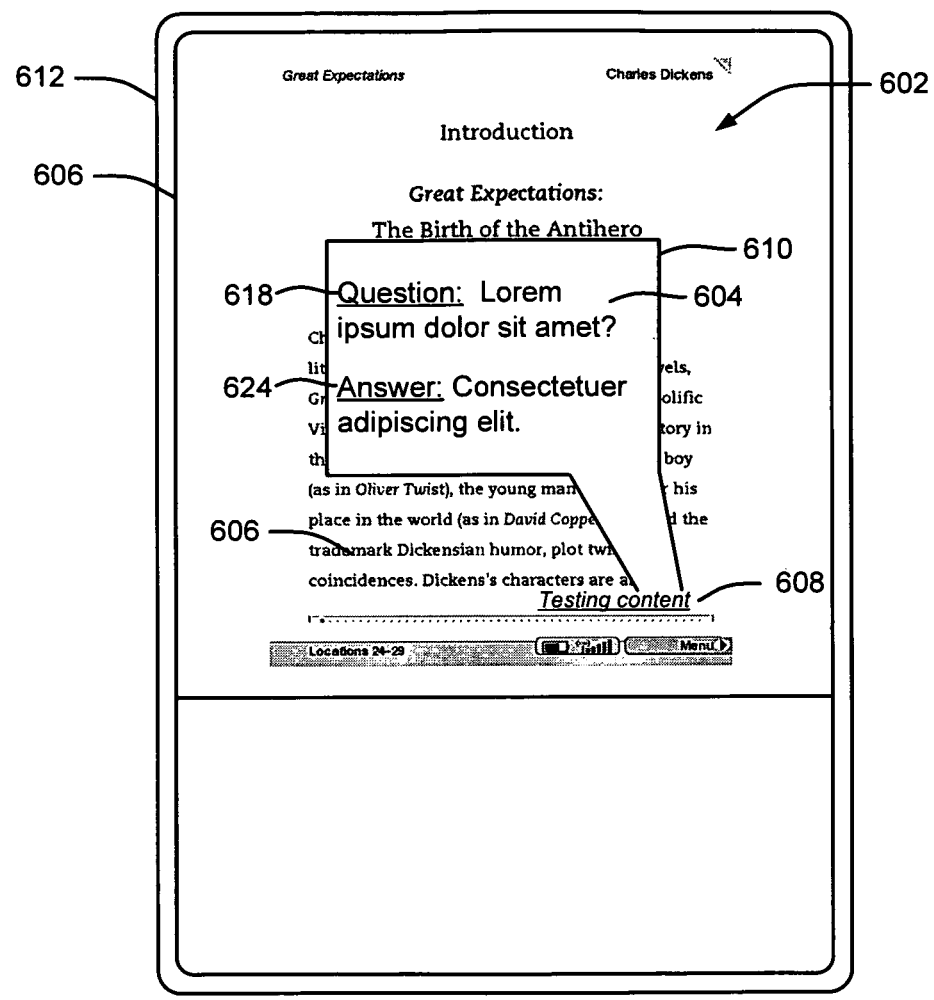
FIG. 6 illustrates the display of a digital media item with associated testing content.

FIG. 6 illustrates one configuration of a digital media item 602 with associated testing content 604 being displayed. The digital media item 602 may be displayed on a user device 104. In one configuration, the digital media item 602 may be displayed on a user device 104 in the form of a display window 606 (e.g., a browser). The display of the digital media item 602 on the user device 104 may include a link 608 to the testing content. The link 608 may be an HTML link 608, a Java link 608, or other link type capable of linking the digital media item 602 to the testing content 604. The link 608 may require that the user click on the link 608 to bring up the testing content 604. Alternatively, the link 608 may automatically bring up the testing content 604 when the user has reached a certain point in the digital media item 602. For example, suppose that a digital media item 602 is an eBook 602. The testing content 604 associated with an eBook 602 may automatically appear after a user finishes a chapter of the eBook 602. Alternatively, the testing content 604 may appear once a user has viewed a particular page, section, or chapter of an eBook 602. Alternatively still, the testing content 604 may appear once a user has viewed an eBook 602 for a preset amount of time.

In one configuration, the testing content 604 may appear in the form of a pop-up window 610. The pop-up window 610 may appear on the same screen 612 or display window 606 as the digital media item 602. Alternatively, the pop-up window 610 may appear on a different screen 612 than that showing the digital media item 602.

The testing content 604 in FIG. 6 is shown as a pop-up window 610. The testing content 604 may also appear in the form of a hover ad, such that the testing content 604 appears in front of the display window 606. In one configuration, the testing content 604 may appear superimposed over the digital media item 602 in a transparent layer.

The testing content 604 may include one or more testing questions 618. The testing content 604 may also include answers 624 to the testing questions 618. The answers 624 may be displayed in the pop-up window 610. The answers 624 may be displayed some period of time after the testing questions 618 are displayed, in order to give the user time to answer the testing questions 618.

Figure 7:
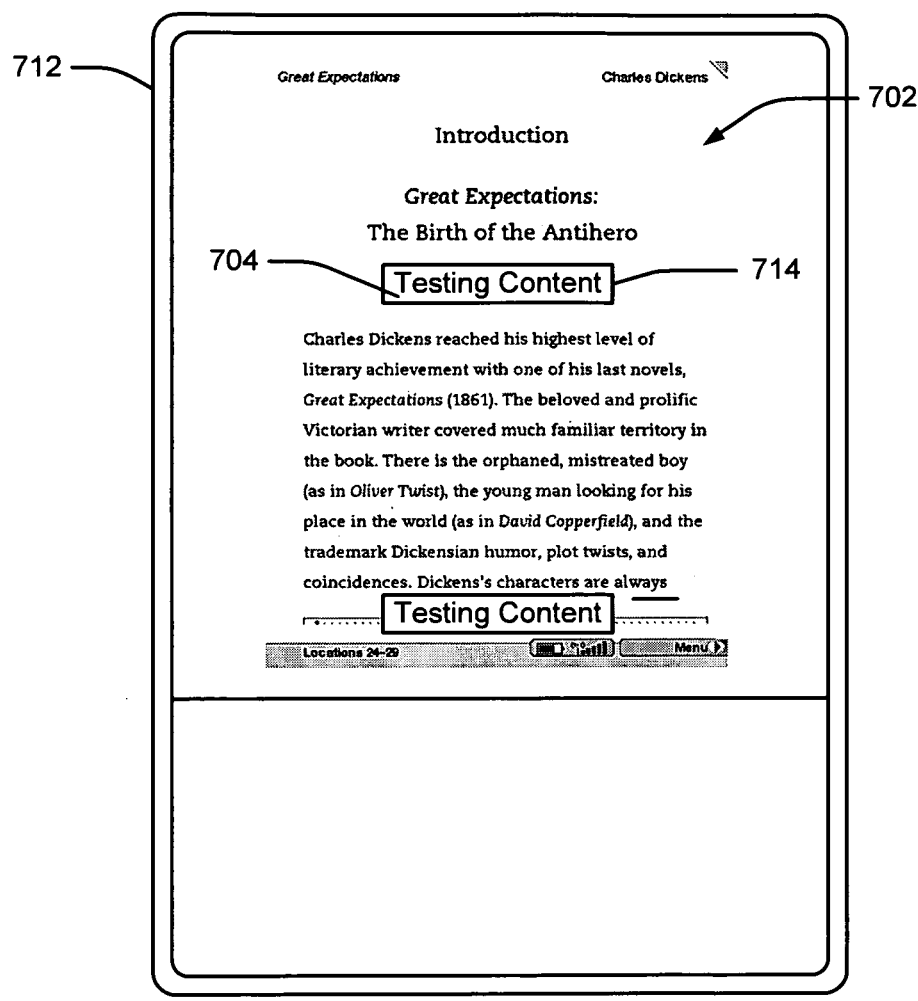
FIG. 7 illustrates another example of a digital media item associated testing content being displayed.

FIG. 7 illustrates another configuration of a digital media item 702 associated testing content 704 being displayed. The testing content 704 may be displayed interwoven with the display of the digital media item 702. For example, the testing content 704 for an eBook 702 may appear on the same page or the same screen 712 as the text for the eBook 702. In one configuration, the testing content 704 may be in textual form. Alternatively, the testing content 704 may be in the form of audio. Alternatively still, the testing content 704 may be in the form of a picture or drawing. In one configuration, the testing content 704 may include a combination of two or more of the above mentioned testing content 704 forms.

As discussed above, the testing content 704 may be displayed on the same page as the text of the eBook 702. The testing content 704 may appear as a testing content section 714. The testing content 704 may also appear as text interpolated throughout the text of the eBook 702. In one configuration, the testing content 704 may be displayed in an alternate font or color to distinguish it from the text of the eBook 702. Alternatively, the testing content 704 may be displayed with a box around it to differentiate it from the original text of the eBook 702.

Multiple testing content sections 714 may appear on one viewing page of the eBook 702. For example, a single viewing page of an eBook 702 may contain three different testing content sections 714. A testing content section 714 may include one or more test questions pertaining to the eBook 702. For example, a testing content section 714 may include two questions that pertain to the preceding eBook 702 material. Alternatively, the testing content section 714 may include questions that pertain to other materials than that of the eBook 702 or other type of digital media item 702. For example, where the digital media item 702 includes multiple issues (e.g., periodicals, blogs, chapter books released chapter-by-chapter), a testing content section 714 may include questions that pertain to a previous issue of the digital media item 702. In one configuration, a testing content section 714 may include questions that pertain to an entirely different digital media item 702.

Figure 8:
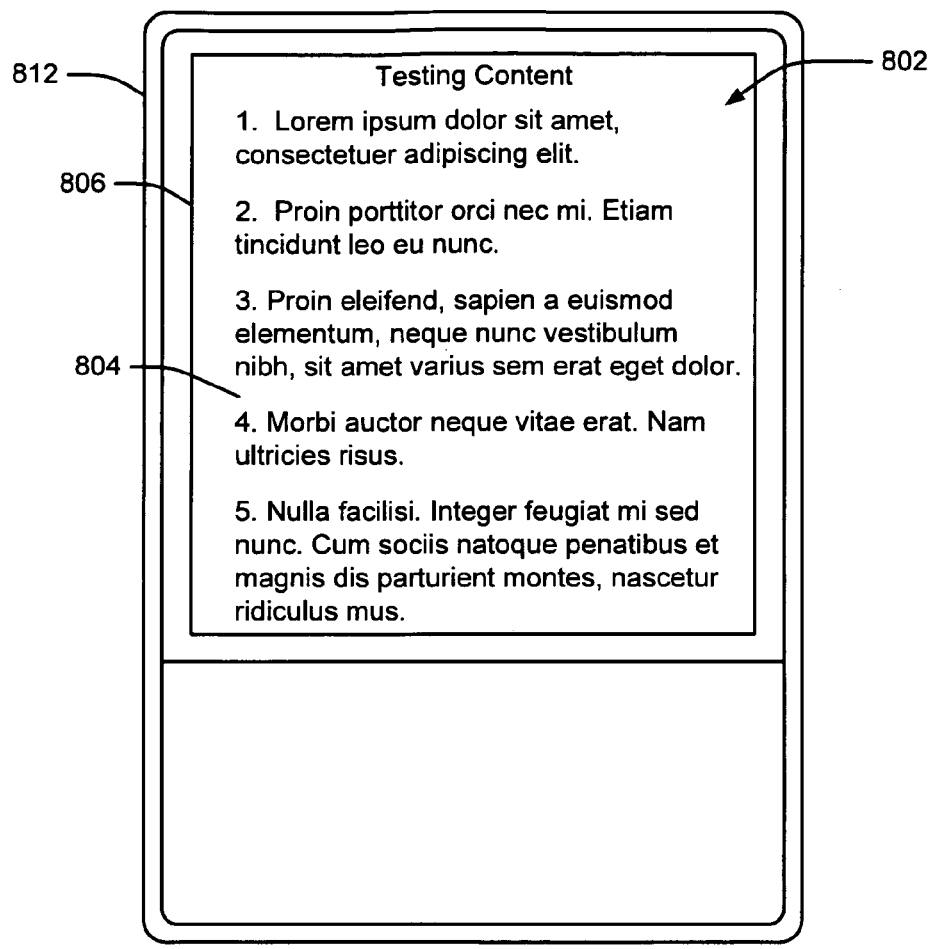
FIG. 8 illustrates another example of a digital media item associated testing content being displayed.

FIG. 8 illustrates testing content 804 being displayed. The testing content 804 is associated with a digital media item 602. The testing content 804 may be displayed in a different display window 806 than the display window that is displaying the digital media item 602. The display window 806 that displays the testing content 804 may cover or replace the digital media item 602 on the screen 812. In one configuration, the testing content 804 may include one or more multiple choice questions. Alternatively, the testing content 804 may include a text box for the user to input an answer to a question.

The user device 104 may display answers to the testing questions presented to the user. The answers to the testing questions may be displayed inside the testing content 804. In one configuration, the testing content 804 may display the correct answer to a testing question after a user has input an incorrect answer to the testing question. Alternatively, the testing content 804 may only display the correct answer to a testing question once the user has input the correct answer to the testing question. Alternatively still, the testing content 804 may only display the correct answer to a testing question once the user has input answers to all the testing questions for a digital media page, chapter, installment, book, or for a particular testing content section 714.

In one configuration, the testing content 804 may display a reference to the digital media item 602 instead of displaying the correct answer to a testing question. The reference may include a link 608 that automatically allows the user to view the chapter, page, section, installment, etc., of the digital media item 602 that includes the correct answer to the testing question. In one configuration, the link 608 may highlight the particular chapter, page, section, installment, etc., that includes the answer to the testing question. The link 608 may also provide an additional link 608 that returns the user to the testing content section 714.

In one configuration, the testing content 804 may not display the correct answer to the user. Instead, the answers entered by the user for the testing questions may be saved into a database. The database may then be accessed by a testing content administrator such as a teacher to ensure that the digital media item 602 was actually observed by the user.

In one configuration, the testing content 804 may be displayed to the user until the user chooses to return to viewing the digital media item 602. For example, the user may finish answering the testing questions from the testing content 804 and may desire to continue viewing the testing questions and/or the sections of the digital media item 602 that pertain to the testing questions. The user may have to click on a link 608 in the testing content 804 that indicates they are finished with the testing content 804. The link 608 may return the user to observing the digital media item 602.

Alternatively, the testing content 804 may stop being displayed to the user once all the testing question in the testing content 804 have been answered by the user. In one configuration, the testing content 804 may stop being displayed to the user once a certain amount of time has passed.

Figure 9:
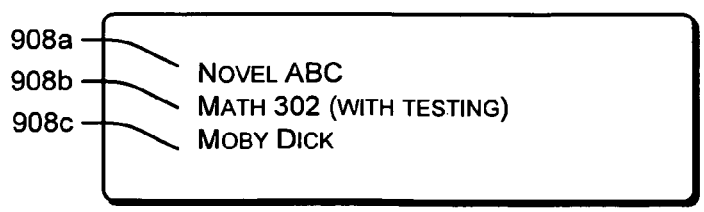
FIG. 9 illustrates one configuration for selecting a digital media item to be displayed using the present systems and methods.

FIG. 9 illustrates one configuration for selecting a digital media item 602 to be displayed using the present systems and methods. A digital media item 602 may include testing content 604 when it is received by the user device 104. Alternatively, testing content 604 for a digital media item 602 may be received separately by the user device 104. In one configuration, one or more digital media items 602 with testing content 604 may be located on the user device 104. Alternatively, one or more of the digital media items 602 located on the user device 104 may not include testing content 604.

The user may wish to identify which digital media items 602 located on the user device 104 include testing content 604. In FIG. 9, links 908a-c to three different digital media items 602 are shown on the user device 104. In this configuration, the first link 908a is associated with a digital media item 602 that does not include testing content 604. The second link 908b is associated with a digital media item 602 that includes testing content 604, and therefore the link 908b is listed along with the phrase "with testing." The third link 908c is associated with a digital media item 602 that does not include testing content 604.

Alternatively, the listing may include other/additional markings to inform the user that a particular digital media item 602 includes testing content 604. For example, the second link 908b may be listed along with a symbol such as 'T' to indicate that the corresponding digital media item 602 includes testing content 604.

Figure 10:
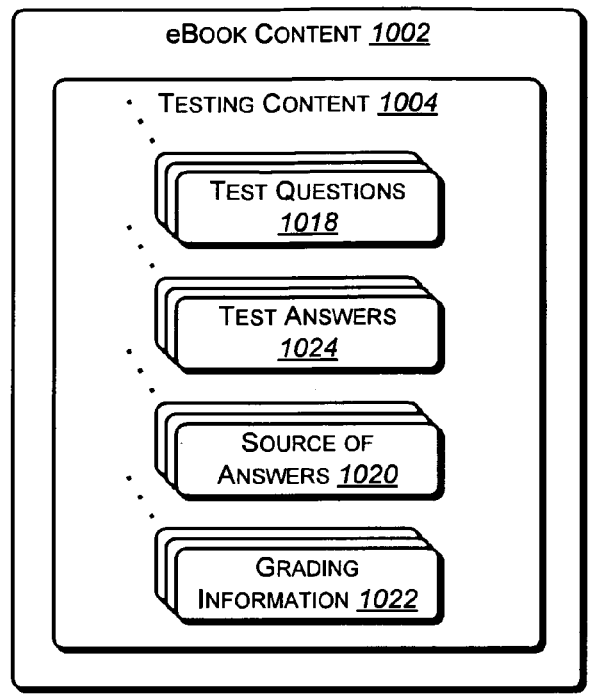
FIG. 10 illustrates one configuration of an eBook that includes testing content.

FIG. 10 illustrates one configuration of an eBook 1002 that includes testing content 1004. The eBook 1002 may include the actual content of the eBook 1002 including the text, audio, graphical, and video representations of the eBook 1002. In one configuration, the eBook 1002 may include testing content 1004. The testing content 1004 may include test questions 1018 associated with the particular page, section, chapter, etc., of the book. The test questions 1018 may be in textual form. Alternatively, the test questions 1018 may be in the form of audio, video, graphics, etc. In one configuration, all the test questions 1018 in the testing content 1004 may be of the same form (e.g. text). Alternatively, the test questions 1018 in the testing content 1004 may have varying forms (e.g. one test question 1018 may be text and another test question 1018 may be audio).

The testing content 1004 may include test answers 1024 to the test questions 1018. The test answers 1024 may be in the same format as the test questions 1018. Alternatively, the test answers 1024 may be in a different format than that of the associated test questions 1018 (e.g. a test question 1018 may be text but the test answer 1024 may be audio).

The testing content 1004 may include a source 1020 of test answers. The source 1020 of test answers may include links 608 to particular sections of the eBook 1002. Alternatively, the source 1020 of test answers may include citations to the particular section of the eBook 1002 that provides the answer to the related test question 1018. In one configuration, the source 1020 of test answers may include a visual representation of how to obtain the test answer 1024. For example, the source 1020 of test answers may include a visual representation of how to solve a math test question.

The testing content 1004 may include grading information 1022. The grading information 1022 may include alphabetical or numerical grades that can be assigned to a user once the testing content 1004 has been completed. For example, a user that has received a score of 90% on a particular set of testing questions 1018 in the testing content 1004 may be assigned an 'A' grade and a user that has received a score of 80% on the set of testing questions 1018 in the testing content 1004 may receive a 'B' grade.

The testing content 1004 may be embedded within the eBook 1002 content. For example, the eBook 1002 and the testing content 1004 may be located in a single file.

Figure 11:
FIG. 11 illustrates another configuration of an eBook and associated testing content.

FIG. 11 illustrates an eBook file 1102 and a testing file 1130. The testing file 1130 includes testing content 1104. The testing content 1104 may be located in a file 1130 that is separate from the eBook file 1102, which contains the eBook content 1132. The user device 104 may require access to both the eBook file 1102 and the testing file 1130 for testing to occur. In one configuration, the testing content 1104 may be located in a single file 1130. Alternatively, the testing content 1104 may be located in several files 1130.

Figure 12:
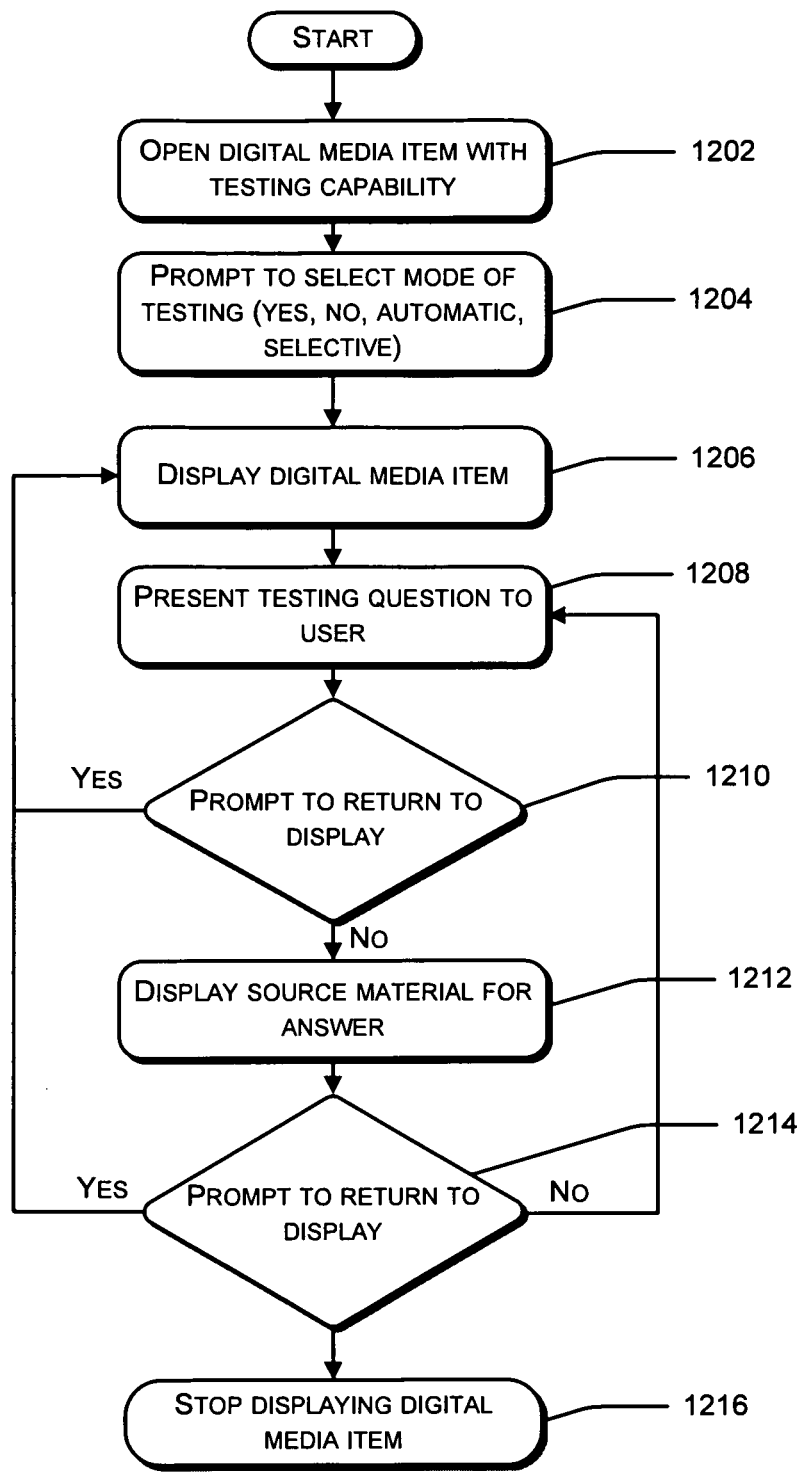
FIG. 12 illustrates a flow diagram of a method for testing within digital content.

FIG. 12 is a flow diagram that illustrates a method 1200 for testing within a digital media item 602. The user device 104 may open 1202 a digital media item 602 that includes testing capabilities. A user may be prompted 1204 to select the desired mode of testing. In one configuration, the user may be prompted to choose between having testing turned on and having testing turned off. In another configuration, the user may be prompted to choose between automatic testing and selective testing.

Automatic testing may test the user with all the questions included in the testing content 604. Alternatively, automatic testing may only test the user with random testing questions from the testing content 604. Alternatively still, automatic testing may test the user according to the user's understanding of the digital media item 602. For example, automatic testing may test the user with testing questions from the testing content 604 that are similar to questions the user has previously missed.

Selective testing may allow the user to select which questions will be presented. In one configuration of selective testing, the user may choose the level of difficulty for the testing questions which will be presented. Alternatively, the user may select specific topics that will be presented in the testing questions. For example, selective testing may only present questions concerning grammar, reading comprehension, or vocabulary.

The user device 104 may then display 1206 the digital media item 602. The user device 104 may then present 1208 the user with a testing question 1018 from the testing content 604. The user may choose to answer the presented question 1018, or alternatively, the user may choose to skip the presented question 1018. The user may then be prompted 1210 to choose whether to return to viewing the digital media item 602 or to view the source material 1020 for the answer to the question 1018 presented. If the user chooses to return to viewing the digital media item 602, the user device 104 may display 1206 the digital media item 602 where the user left off viewing.

Alternatively, at the user's selection, the user device 104 may display 1212 the source material 1020 for the answer to the question 1018 presented. In one configuration, the user device 104 may only display 1212 the source material 1020 for a limited time before the user device 104 automatically returns 1214 to displaying 1206 the digital media item 602 where the user left off.

Once the user is finished viewing the source material 1020 for the answer to the testing question 1018 presented, the user may be prompted 1214 to choose whether to be presented with another testing question 1018 or to stop viewing the source material 1020. At any time, the user device 104 may stop 1216 displaying the digital media item 602.

Figure 13:
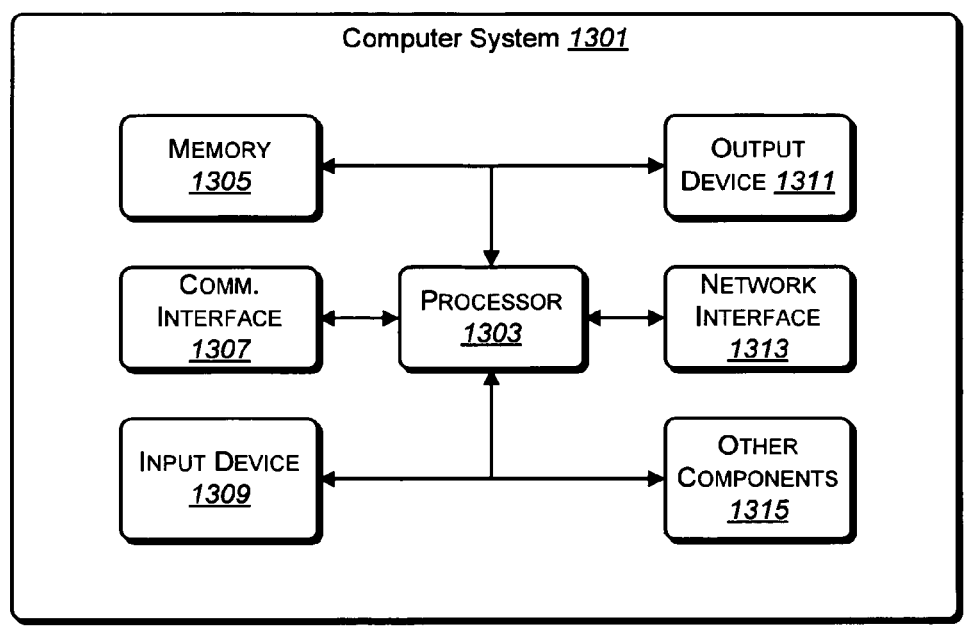
FIG. 13 illustrates various components that may be utilized in a computer system.

FIG. 13 illustrates various components that may be utilized in a computer system 1301. One or more computer systems 1301 may be used to implement the various systems and methods disclosed herein. For example, a computer system 1301 may be used to implement an origination device 102, a destination device 103, or the server 104. The illustrated components may be located within the same physical structure or in separate housings or structures. Thus, the term computer or computer system 1301 is used to mean one or more broadly defined computing devices unless it is expressly stated otherwise. Computing devices include the broad range of digital computers including microcontrollers, hand-held computers, personal computers, servers 104, mainframes, supercomputers, minicomputers, workstations, and any variation or related device thereof.

The computer system 1301 is shown with a processor 1303 and memory 1305. The processor 1303 may control the operation of the computer system 1301 and may be embodied as a microprocessor, a microcontroller, a digital signal processor (DSP) or other device known in the art. The processor 1303 typically performs logical and arithmetic operations based on program instructions stored within the memory 1305. The instructions in the memory 1305 may be executable to implement the methods described herein.

The computer system 1301 may also include one or more communication interfaces 1307 and/or network interfaces 1313 for communicating with other electronic devices. The communication interface(s) 1307 and the network interface(s) 1313 may be based on wired communication technology, wireless communication technology, or both.

The computer system 1301 may also include one or more input devices 1309 and one or more output devices 1311. The input devices 1309 and output devices 1311 may facilitate user input. Other components 1315 may also be provided as part of the computer system 1301.

FIG. 13 illustrates only one possible configuration of a computer system 1301. Various other architectures and components may be utilized.

Figure 14:
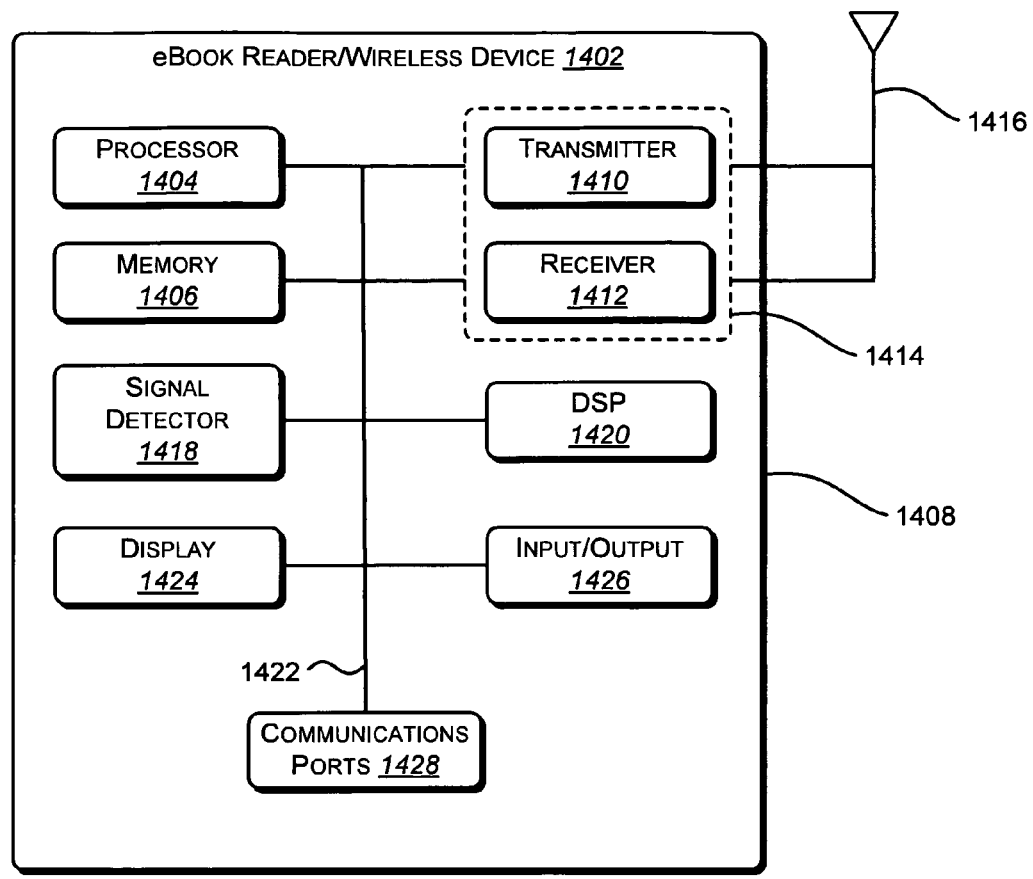
FIG. 14 illustrates various components that may be utilized in an eBook reader/wireless device.

FIG. 14 illustrates various components that may be utilized in an eBook 702 reader/wireless device 1402. The device 1402 is an example of a device that may be configured to implement and/or be used with the various methods described herein, such as the origination device 102 and the destination device 103. Examples of devices 1402 include, but are not limited to, cell phones, laptop computers, personal digital assistants (PDA), tablet computers and eBook 702 reader devices.

The wireless device 1402 may include a processor 1404 which controls operation of the wireless device 1402. The processor 1404 may also be referred to as a central processing unit (CPU). Memory 1406, which may include both read-only memory (ROM) and random access memory (RAM), provides instructions and data to the processor 1404. A portion of the memory 1406 may also include non-volatile random access memory (NVRAM). The processor 1404 typically performs logical and arithmetic operations based on program instructions stored within the memory 1406. The instructions in the memory 1406 may be executable to implement the methods described herein.

The wireless device 1402 may also include a housing 1408 that may include a transmitter 1410 and a receiver 1412 to allow transmission and reception of data between the wireless device 1402 and a remote location. The transmitter 1410 and receiver 1412 may be combined into a transceiver 1414. An antenna 1416 may be attached to the housing 1408 and electrically coupled to the transceiver 1414. The wireless device 1402 may also include (not shown) multiple transmitters, multiple receivers, multiple transceivers and/or multiple antenna.

The wireless device 1402 may also include a signal detector 1418 that may be used to detect and quantify the level of signals received by the transceiver 1414. The signal detector 1418 may detect such signals as total energy, pilot energy per pseudo noise (PN) chips, power spectral density, and other signals. The wireless device 1402 may also include a digital signal processor (DSP) 1420 for use in processing signals.

The wireless device 1402 may also include one or more communication ports 1428. Such communication ports 1428 may allow direct wired connections to be easily made with the device 1402.

Additionally, input/output components 1426 may be included with the device 1402 for various input and output to and from the device 1402. Examples of different kinds of input components include a keyboard, keypad, mouse, microphone, remote control device, buttons, joystick, trackball, touchpad, light pen, etc. Examples of different kinds of output components include a speaker, printer, etc. One specific type of output component is a display 1424.

The various components of the wireless device 1402 may be coupled together by a bus system 1422 which may include a power bus, a control signal bus, and a status signal bus in addition to a data bus. However, for the sake of clarity, the various busses are illustrated in FIG. 14 as the bus system 1422.

Figure 15:
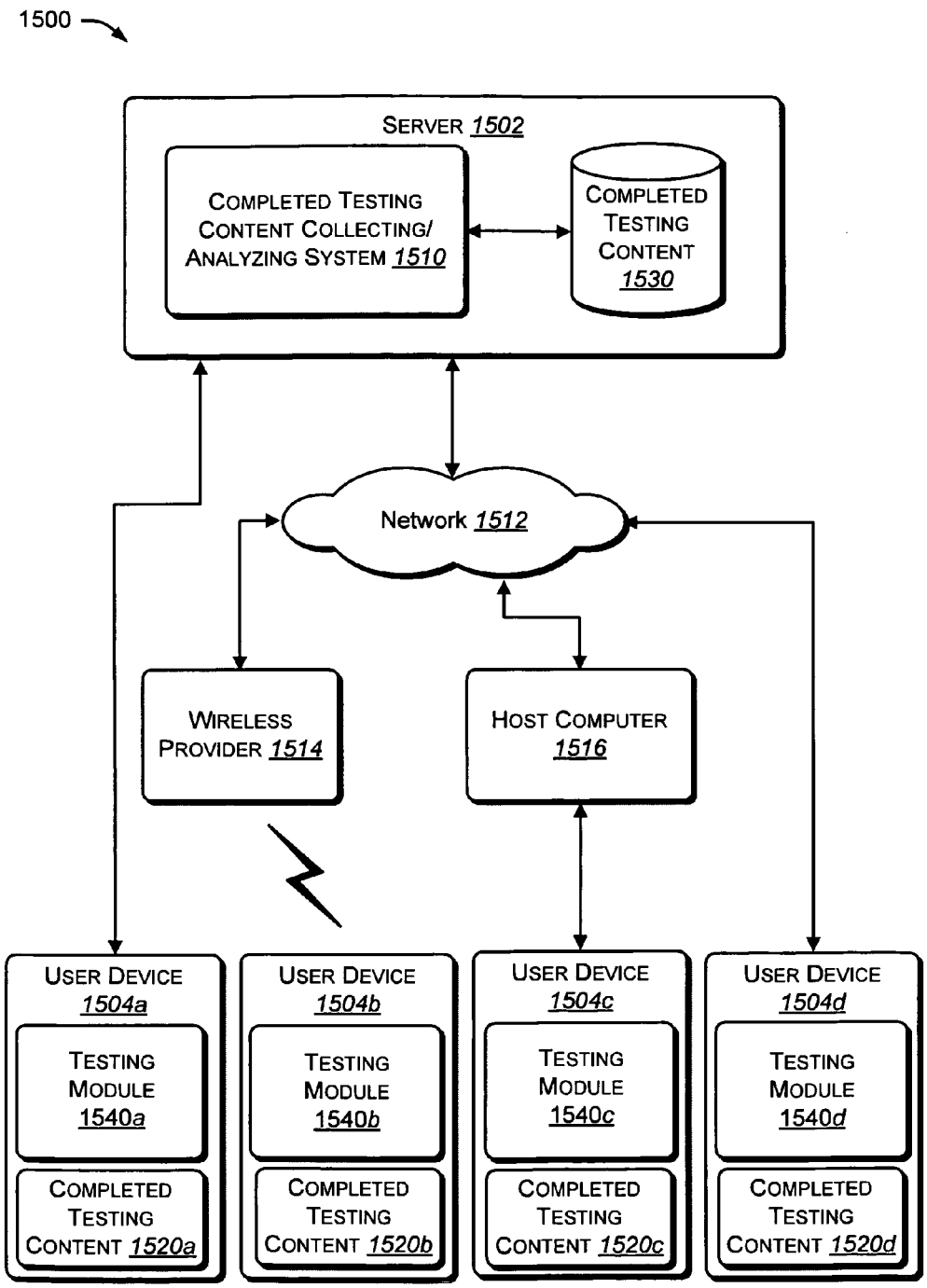
FIG. 15 shows a system including a server with testing content reporting and analysis and multiple user devices in electronic communication with the server.

FIG. 15 shows a system 1500 including a server 1502 with testing content reporting and analysis and multiple user devices 1504 in electronic communication with the server 1502. The server 1502 may include a testing content collecting/analyzing system 1510. The system shown in FIG. 15 may be used in a variety of contexts, including, as an example, an academic environment such as a classroom. In such an environment, students may take tests on user devices 1504 and have their tests automatically reported to the server 1502.

The testing content collecting/analyzing system 1510 may be used by to collect and/or store completed testing content 1520 from one or more user devices 1504 in electronic communication with the server 1502. The server may include a database of completed testing content 1530. The database of completed testing content 1530 may include the completed testing content 1520 from the one or more user devices 1504. For example, the database of completed testing content 1530 may include the completed testing content 1520 for a particular digital media item 602. Alternatively, the database of completed testing content 1530 may include all of the completed testing content 1520 for a particular user device 1504.

The completed testing content 1520 may include the submitted answers to testing questions from testing content 804. For example, the completed testing content 1520 may include the answers that a user of a user device 1504 has submitted in response to testing content 804 for a digital media item 602. A testing module 1540 may administer the test by collecting answers to be stored in the completed testing content 1520 and communicating with the server 1502. The completed testing content 1520 may also include information identifying the testing content 804 for a digital media item 602 that has been completed on the user device 1504. The completed testing content 1520 may further include additional testing content 804 information such as the time of completion, the time spent on each testing question, and the number of references requested by the user to answer a testing question.

The completed testing content collecting/analyzing system 1510 may analyze the completed testing content 1520 stored in the database of completed testing content 1530. For example, the completed testing content collecting/analyzing system 1510 may analyze the completed testing content 1520 to determine statistics about the completed testing content 1520 such as the pass rate, the average time spent, and the questions that the highest percentage of users missed on the testing content 804.

In one configuration, the administrator of the server 1502 may be a teacher in an educational classroom setting. The users of user devices 1504 may be students in the classroom. The teacher may administer testing content 804 to the students and the students may provide answers to testing content 804 by transmitting completed testing content 1520 to the server 1502. The teacher may administer the same testing content 804 to each of the students. Alternatively, the teacher may administer student-specific testing content 804 to each student. The completed testing content collecting/analyzing system 1520 may allow the teacher to monitor each student's progress and further assign grades to each student.

The system 1500 may include one or more user devices 1504 that are in direct electronic communication with the server 1502. For example, the user device 1504*a* may communicate directly with the server 1502 through wired or wireless means. The system 1500 may also include one or more user devices 1504 that are in electronic communication with the server 1502 through a network 1512. For example, user device 1504*b* may communicate wirelessly with a wireless provider 1514. The wireless provider 1514 may then communicate with the server 1502 through the network 1512. A user device 1504*c* may also communicate with a host computer 1516. The user device 1504*c* may communicate with a host computer 1516 using wired or wireless means. The host computer 1516 may then communicate with the server 1502 through the network 1512. A user device 1504*d* may also communicate with the server 1502 through the network 1512 without intermediary modules or devices. A user device 1504*d* may communicate with the network 1512 using wired or wireless means.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method comprising:
receiving, at an electronic book (eBook) reader device comprising one or more processors and one or more storage media that include instructions that are executable by the one or more processors, a notification message to commence voice mode interaction;
in response to receiving the notification message and without commencing the voice mode interaction, automatically initiating, from a server, download of an instruction-bearing update associated with a digital media item, the download initiated by the one or more processors;
updating the digital media item based on the instruction-bearing update, the updating comprising integrating testing content with the digital media item;
displaying an indication that testing content is available for the digital media item, wherein the testing content comprises testing questions about the content of the digital media item;
receiving, by the one or more processors, user input requesting that the testing content be displayed;
prompting, by the one or more processors, a user to select a testing mode from among multiple testing modes, the multiple testing modes comprising an automatic testing mode and a selective testing mode;
when the user selects the automatic testing mode, automatically displaying the testing content after the user has reached designated points in the digital media item;
receiving user input providing answers to the testing questions;
after the testing content has been completed, sending the completed testing content to the server; and
displaying correct answers to the testing questions.

2. The method of claim 1, wherein the digital media item is an electronic book.

3. The method of claim 1, wherein the testing content is displayed in response to a user activating a link.

4. The method of claim 1, wherein the testing content is displayed in a popup window.

5. The method of claim 1, wherein content of the digital media item is displayed in a first display window, and wherein the testing content is displayed in a second display window that is different than the first display window.

6. The method of claim 1, wherein the testing content is displayed interwoven with the display of the digital media item.

7. The method of claim 1, wherein the testing content appears as a testing content section.

8. The method of claim 1, further comprising displaying answers to the testing questions.

9. The method of claim 1, further comprising displaying a source of answers to the testing questions.

10. The method of claim 1, wherein the testing content further comprises testing answers.

11. An electronic device comprising:
a processor;
non-transitory memory coupled with the processor;
instructions stored in the memory, the instructions being executable to:
in response to receiving a notification message and without commencing voice mode interaction, initiate download from a server of an instruction-bearing update associated with a digital media item that is stored in the non-transitory memory;
updating the digital media item based on the instruction-bearing update, the updating comprising integrating testing content with the digital media item, the testing content comprising testing questions about the content of the digital media item;
receive user input indicating whether the testing content should be displayed;
in response to receiving the user input indicating that the testing content should be displayed, automatically display the testing content after the user has reached designated points in the digital media item; and
after the testing content has been completed, sending the completed testing content to the server for analysis
assign a grade to the completed testing content based on the analysis.

12. The electronic device of claim 11, wherein the digital media item is an electronic book.

13. The electronic device of claim 11, wherein the testing content is displayed in response to a user activating a link.

14. The electronic device of claim 11, wherein the testing content is displayed in a pop-up window.

15. The electronic device of claim 11, wherein content of the digital media item is displayed in a first display window, and wherein the testing content is displayed in a second display window that is different than the first display window.

16. The electronic device of claim 11, wherein the testing content is displayed interwoven with the display of the digital media item.

17. The electronic device of claim 11, wherein the testing content appears as a testing content section.

18. The electronic device of claim 11, wherein the instructions are executable to display answers to the testing questions.

19. The electronic device of claim 11, wherein the instructions are executable to display a source of answers to the testing questions.

20. The electronic device of claim 11, wherein the testing content includes correct answers to the testing content.

21. A non-transitory computer-readable medium comprising executable instructions for:
initiating download, from a server, of an instruction-bearing update associated with a digital media item based at least in part on receiving a notification message without commencing a voice mode interaction;

updating the digital media item to include testing content based on the instruction-bearing update;

displaying content of the digital media item for which testing content is available, wherein the testing content comprises testing questions about the content of the digital media item;

receiving user input selecting a testing mode for displaying the testing content;

displaying the testing content in the selected testing mode;

receiving user input providing answers to the testing questions;

after receiving the user input to the testing questions for at least one of a page, a chapter, or a section of the digital media item, displaying one or more of correct answers to the testing questions or references that enable the user to view portions of the digital media item that include the correct answers;

after the testing content has been completed, sending the completed testing content to the server for analysis; and receiving, from the server, the analysis associated with the testing content.

22. An electronic device including a processor configured with executable instructions to perform acts comprising:

in response to receiving a notification message to commence voice mode interaction, initiating download, from a server, of an instruction-bearing update associated with a digital media item without commencing the voice mode interaction;

updating the digital media item to include testing content based on the instruction-bearing update;

receiving user input indicating whether the testing content should be displayed;

displaying content of the digital media item for which testing content is available, wherein the testing content comprises testing questions about the content of the digital media item;

automatically displaying the testing content after the user has reached designated points in the digital media item if the user input indicates that the testing content should be displayed;

after the testing content has been completed, sending the completed testing content to the server to perform an analysis of the user input; and assigning an alphabetical or numerical grade to the completed testing content in response to receiving the analysis from the server.

* * * * *